United States Patent [19]

Pak et al.

[11] Patent Number: 5,670,103

[45] Date of Patent: Sep. 23, 1997

[54] METHOD FOR MAKING CERAMIC FIBERS FROM A WATER SOLUBLE PRE-CERAMIC POLYMER SOLUTION

[75] Inventors: Sung S. Pak, Evington; Archie N. Tolley, Appomattox, both of Va.

[73] Assignee: The Babcock & Wilcox Company, New Orleans, La.

[21] Appl. No.: 561,226

[22] Filed: Nov. 21, 1995

Related U.S. Application Data

[63] Continuation of Ser. No. 307,218, Sep. 16, 1994, abandoned, which is a continuation of Ser. No. 61,134, May 13, 1993, Pat. No. 5,437,852.

[51] Int. Cl.$^6$ .................................................. C04B 33/32
[52] U.S. Cl. ............... 264/66; 264/211.11; 264/211.12; 501/12; 501/95
[58] Field of Search ........................ 264/66, 211.11, 264/211.12; 501/12, 95

[56] References Cited

U.S. PATENT DOCUMENTS

| | | | |
|---|---|---|---|
| 4,710,227 | 12/1987 | Harley et al. | 106/193 R |
| 4,757,036 | 7/1988 | Kaar | 501/95 |
| 5,037,577 | 8/1991 | Yamanoi et al. | 252/301.4 R |
| 5,196,388 | 3/1993 | Shyu | 501/134 |

OTHER PUBLICATIONS

T.A. Parthasarathy, T-I May, K. Keller, "Creep Mechanism of Polycrystalline Yttrium Aluminum Garnet," J. Am. Cer. 75(7) 1756–9 1992.

High Performance Synthetic Fibers for Composites, Publ. NMAB–458 National Academy Press, Wash. D.C. 1992 pp. 49–102.

T.F. Cooke, "Inorganic Fibers—A Literature Review," J. Am. Cer. Soc., 74(12) 2959–78 (1991).

P. Colomban, "Gel Technology in Ceramics, Glass–Ceramics and Ceramic–Ceramic Composites," Ceram. Inter., 15 pp. 23–50 (1989).

R. Roy, "Ceramics by the Solution–Sol–Gel Route," Science, 238, pp. 1664–1670 (1987).

B.E. Yoldas, "Preparation of Glasses and Ceramics from Metal Organic Compounds," J. Mater. Sci. 12 pp. 1203–1208 (1977).

K.S. Mazdiyasni, "Powder Synthesis from Metal Organic Precursors," Ceram. Inter. 8, pp. 42–56, 1982.

P.E.D. Morgan, "Innovative Chemical/Ceramic Directions," Mater. Res. Soc. Symp/ Proc. 73, (1986) pp. 751–763.

H. Okamura and H. K. Bowen, "Preparation of Alkoxides for the Synthesis of Ceramics," Ceram. Inter. 12, (1986) pp. 161–171.

Y. Nomiya, "Present State and Future Prospects for the Colloid Process for Fine Ceramics," J. Cer. Soc. Jpn. Intern. Ed. 97 (1989) R21–R29.

*Primary Examiner*—Christopher A. Fiorilla
*Attorney, Agent, or Firm*—Daniel S. Kalka; Robert J. Edwards

[57] ABSTRACT

A method of making ceramic fibers from a water soluble pre-ceramic polymer solution by forming fibers from a water soluble pre-ceramic polymer solution, drying the formed fibers at a first temperature ranging between 600° C.–750° C. at a temperature heating rate of about 1° C. per minute. Next, raising the first temperature to a second temperature ranging from 800° C.–1000° C. at about 5° C. per minute, and increasing the second temperature to still a third temperature of about 1200° C. at about 10° C. per minute and holding at the third temperature for about 1 hour. Finally, the fibers are cooled to room temperature at a rate of about 5° C. to 30° C. per minute.

5 Claims, 11 Drawing Sheets

 
FIG. IA  FIG. IB

METHOD FOR MAKING CERAMIC FIBERS FROM A WATER SOLUBLE PRE-CERAMIC POLYMER SOLUTION

This is a continuation of application Ser. No. 08/307,218 filed Sep. 16, 1994 now abandoned which is a continuation of application Ser. No. 08/061,134 filed May 13, 1993 now U.S. Pat. No. 5,437,852.

BACKGROUND OF THE INVENTION

1. Field of the Invention

The present invention relates in general to a process of synthesizing inorganic polymers, and more particularly to the production of water-soluble aluminum and yttrium based polymers for use in thin films, fibers, and composite matrices.

2. Description of the Related Art

Ceramics can be prepared from a number of precursor states such as molten liquid, powder, vapor, and polymer. The polymer based process, despite its relatively short history, has been the subject of much interest because of its potential economic benefits. Compared to vacuum deposition techniques, it is a far more cost-effective way of depositing ceramic coatings. Antireflective coatings on window glass and silicon solar cells, planarization layers on ultrasmooth surface mirrors, and superconducting thin films on microwave cavities are some examples. In addition to the economic benefits, the technique allows fabrication of shapes that are impossible by other methods. For example, the viscoelasticity of high molecular weight polysiloxane and zirconium acetoacetonate derivatives allows the fabrication of high modulus $SiO_2$ and $ZrO_2$ fibers, respectively.

Despite the success, the polymer route has not yet gained industry-wide acceptance mainly because of the following two problems: 1) difficulty in handling, or intractibility, and 2) low ceramic yield. The intractibility arises due to the improper choice of precursors. The most often used precursors for polymer synthesis are metal alkoxides or derivatives of metal alkoxides, all of which are hygroscopic. Use of large quantities of anhydrous organic solvents and handling in inert atmospheres are therefore unavoidable. Low ceramic (or char) yield is another problem. Most pre-oxide polymers have ceramic yields far below 30% and no polymer with a yield greater than 40% has been reported. The low yields cause large drying and sintering shrinkages which invariably lead to poor dimensional control.

Therefore, it is desirable to have a process for synthesizing water-soluble pre-ceramic polymers of high char yields from inexpensive precursors. Such a process would be of tremendous economic value.

SUMMARY OF THE INVENTION

The present invention solves the aforementioned problems with the prior art as well as others by providing a method for making a water Soluble pre-ceramic polymer. The water soluble pre-ceramic polymers of the present invention are suitable for impregnating preform tubes. Further impregnations are attainable beyond 18% by a unique approach with addition of alcohol.

Alternately, fibers are fabricated directly from the pre-ceramic polymer by adjustment of the polymer solution viscosity to exceed 10" centipoise (cps).

Advantageously, several compounds including nitrate stabilized zirconia sol, acetate stabilized zirconia sol, $Y_2O_3$ stabilized $ZrO_2$ powder, and $Y_4Al_5O_{12}$ may be added to the pre-ceramic polymer for particular applications. Also, an item of hot pressed $Y_2O_3$ stabilized $ZrO_2$ may be coated with a highly concentrated polymer solution of the present invention.

The method of the present invention makes a water soluble pre-ceramic polymer by heating a hydrated metal salt in a furnace to a temperature above the melting point of the hydrated metal salt. A flow of air is provided above the melt to drive the polymerization reaction forward until a predetermined weight loss of the pre-ceramic polymer is obtained.

An object of the present invention is to synthesize water-soluble polymers in which major portions consist of metal and oxygen atoms.

Another object of the present invention is to synthesize water-soluble pre-ceramic polymers from inexpensive precursors.

Yet another object of the present invention is to impregnate fiber preforms with polymer solutions of the present invention as precursors to matrices.

Still another object of the present invention is to spin ceramic fibers of fine diameter and microcrystalline grains from the polymers of the present invention.

Still a further object of the present invention is to deposit thin films on ceramic substrates from the polymers of the present invention.

The various features of novelty characterized in the present invention are pointed out with particularity in the claims annexed to and forming a part of this disclosure. For a better understanding of the invention, the operating advantages attained by its uses, reference is made to the accompanying drawings and descriptive matter in which a preferred embodiment of the present invention is illustrated.

BRIEF DESCRIPTION OF THE DRAWINGS

In the drawings:

FIG. 1 is a photograph of an $Al_2O_3$ polymer powder prepared in accordance with the present invention and on its right a solution prepared by dissolving the polymer in water;

DESCRIPTION OF THE PREFERRED EMBODIMENTS

The present invention resides in the ability of hydrated metal salts to undergo polycondensation reactions at temperatures above their melting points. The method comprises the steps of heating metal salts to temperatures above their melting points and holding the melts in a well ventilated oven to drive off hydrated water and the ligands. The constant flow of fresh air above the melt in the range of 200 to 2000 cubic centimeters per minute and preferably between 500 and 1000 cc/min drives away the ligands as they are expelled from the growing polymer chains. This drives the polymerization reaction forward and increases the lengths of the polymers. The heating is continued until all the free ligands are driven off and only solid polymers are left. This is determined by the amount of weight lost during heating. The overall process may be represented by the following chemical equation:

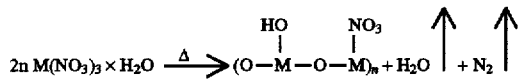

where M is a metal such as aluminum or yttrium, and n is the number of repeating units in the polymer chain. The equation is not balanced for simplicity. Care must be exercised so as not to overheat the polymers. The temperature above the melting point of the polymers should not exceed 100° C. Some ligands must be left attached to the polymers as side groups for them to be water-soluble. A predetermined weight loss of less than 73 weight percent for $Al_2O_3$ polymers and 36 weight percent for $Y_2O_3$ polymers provides for this. The solid polymers readily dissolve in heated water at a temperature higher than about 60° C. to give highly concentrated solutions. The polymer solutions have shelf lives in excess of 6 months at room temperature and at a pH below 4.

The following examples are illustrative of test results that demonstrate the present invention:

EXAMPLE 1

Figure 2A:
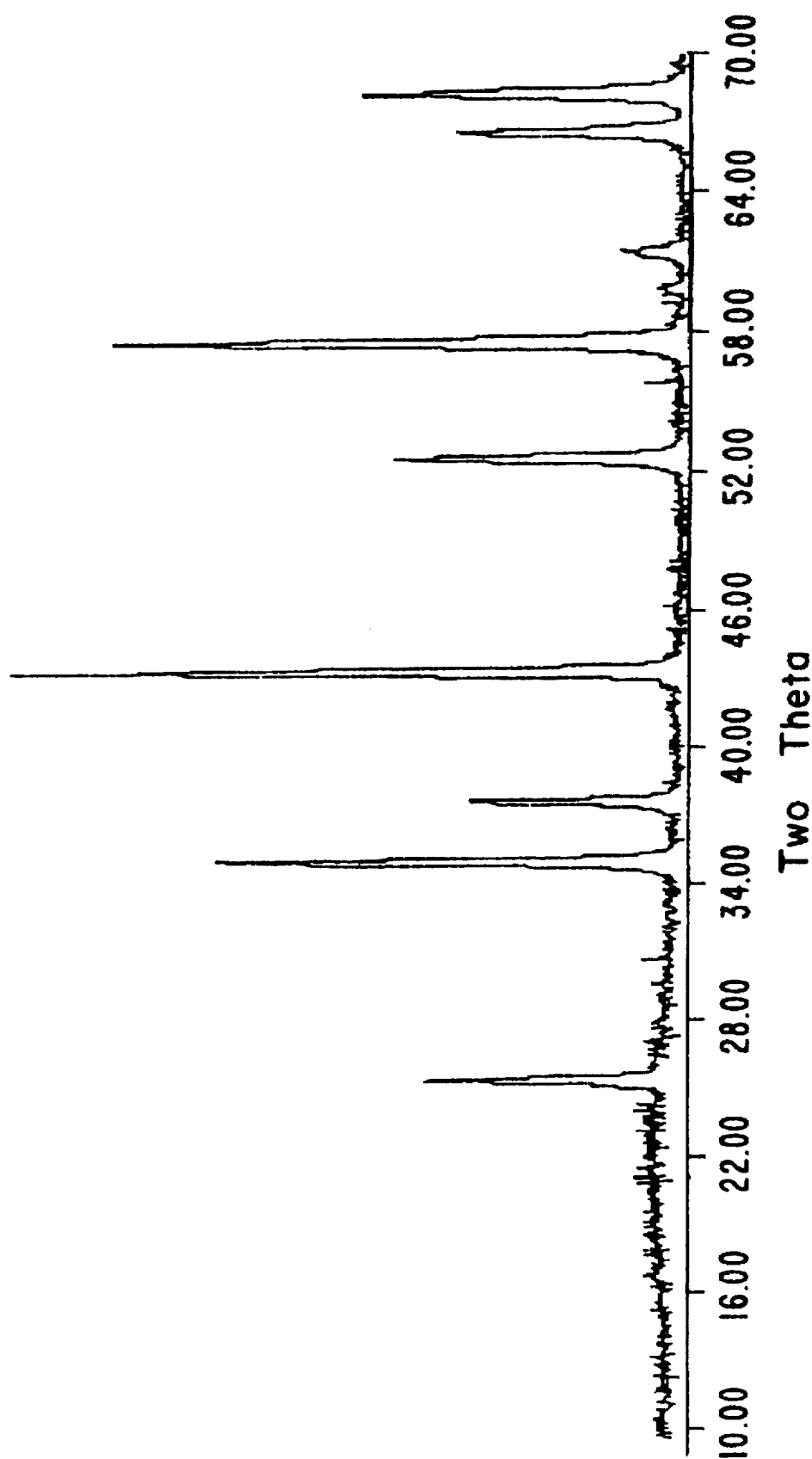
FIG. 2 is a pair of x-ray diffraction patterns of a pre-$Al_2O_3$ polymer plotted as a function of $2e$, which is the angle between the transmitted and diffracted x-rays. It indicates that the as-prepared polymer is amorphous and that after heating at 1200° C. for 1 hour crystallizes to $\alpha$-$Al_2O_3$.
Figure 2B:
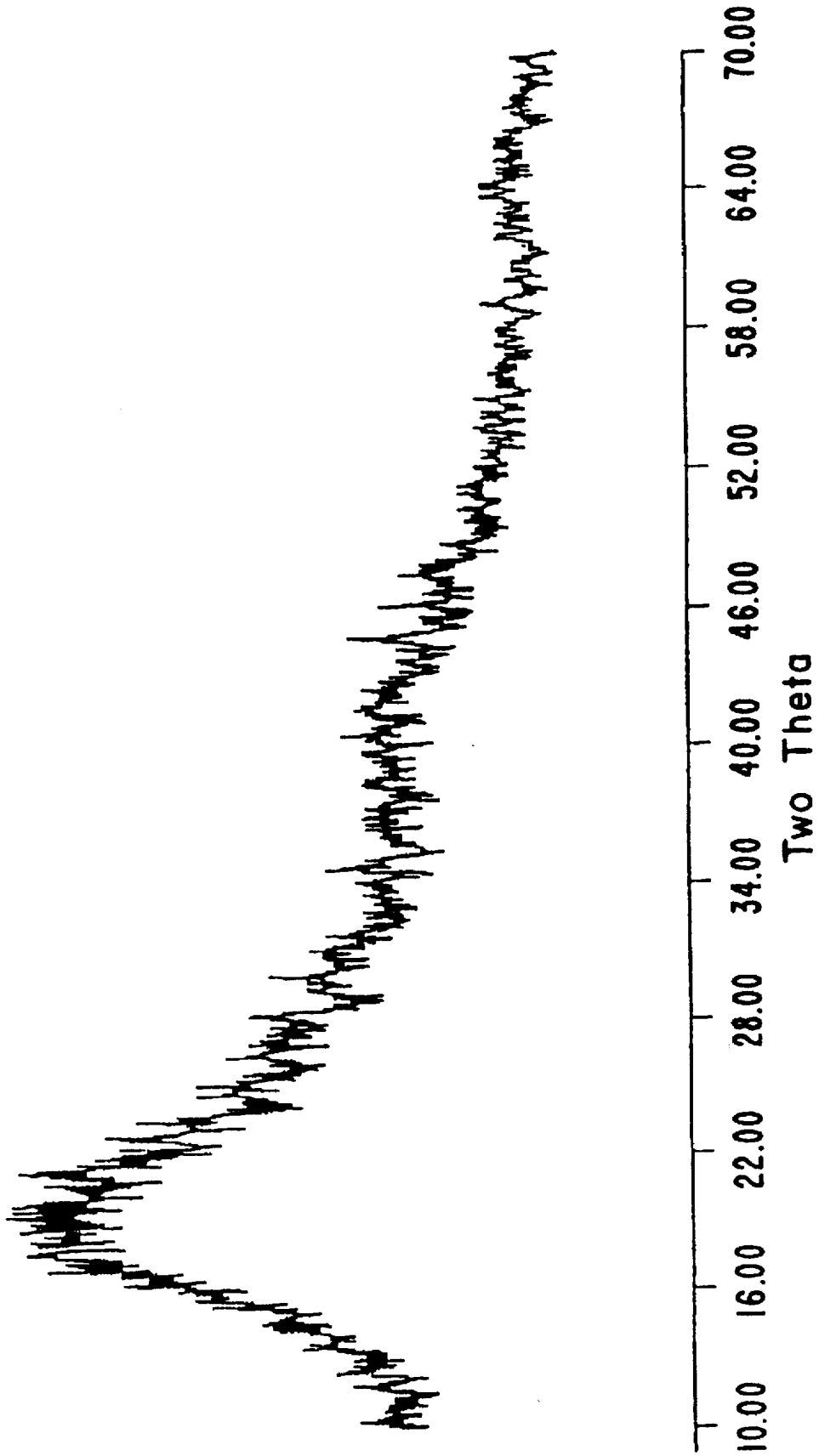
Figure 3A:
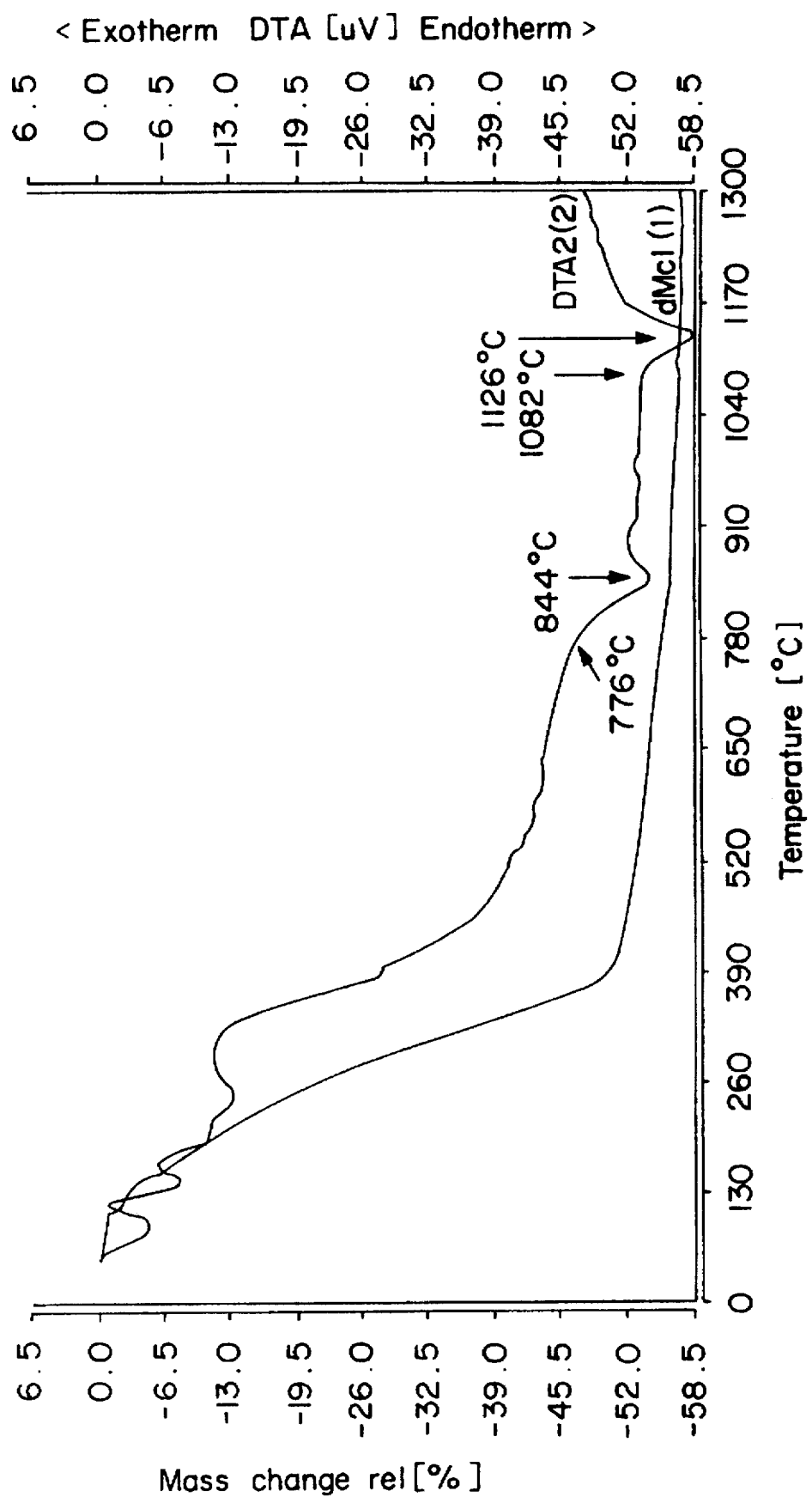
FIG. 3(a) is a combined graph of a differential thermal analysis (DTA) and a thermogravimetric analysis (TGA). It indicates that the polymer crystallizes from an amorphous state to e-$Al_2O_3$ at 776° C. and $\alpha$-$Al_2O_3$ at 1082° C., respectively.
Figure 3B:
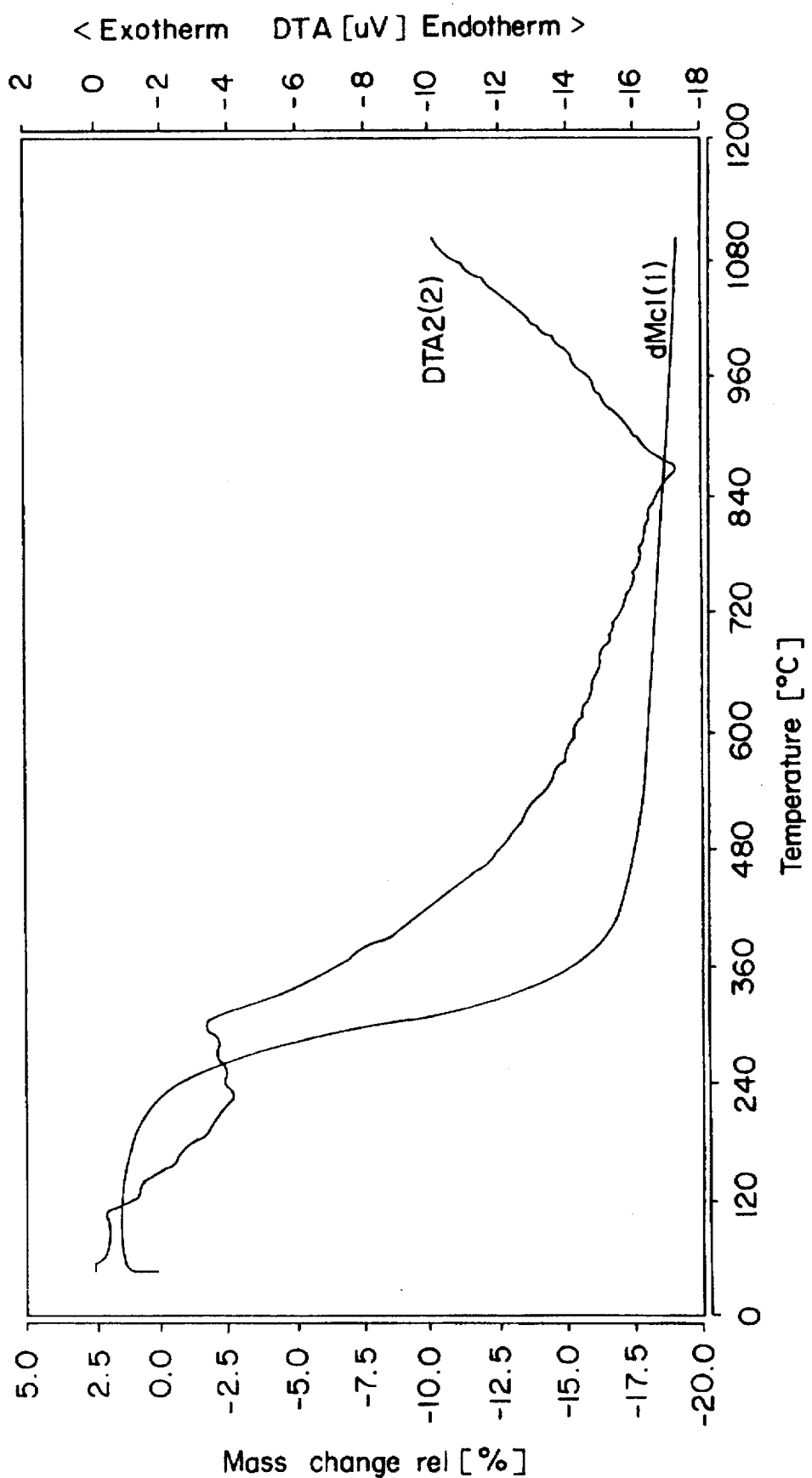
FIG. 3(b) is another combined graph of a DTA and TGA. It shows that the polymer has a ceramic yield as high as 80% on a weight percent basis.

$Al_2O_3$ Precursor Polymer 1488 g of $Al(NO_3)_3 9H_2O$ powder is spread evenly in a rectangular ceramic tray whose dimensions are approximately 12"×10.5"×2.5". The tray is placed in a large drying oven equipped with a convection fan. The temperature of the oven is raised to a temperature between −110° and 190° C. and kept at that level to allow the melting of the salt, expulsion of hydrated water and nitrate ligands, and polymerization to take place. Heating is continued for 48 hours or until the total weight loss is between 71.5% and 73% on a weight percent basis. The formed white, amorphous polymer readily dissolves in water at temperature exceeding 60° C. (FIG. 1), and has a ceramic yield of 80% by weight, note FIG. 3(b), and crystallizes to fully crystalline $\alpha$-$Al_2O_3$ at 1080° C. as evidenced by FIGS. 2 and 3(a).

EXAMPLE 2

$Y_2O_3$ Precursor Polymer 1.0 g of $Y(NO_3)_3 6H_2O$ is placed in a 6 inch long $Al_2O_3$ boat. The boat is then placed inside a well ventilated oven and the temperature is raised to 275° C. The temperature is maintained until the total weight loss is between 34% and 36% on a weight percent basis. The formed white, solid polymer has a ceramic yield of 40% by weight.

EXAMPLE 3

$Al_2O_3$ Matrix Composite Fabrication

Figure 4:
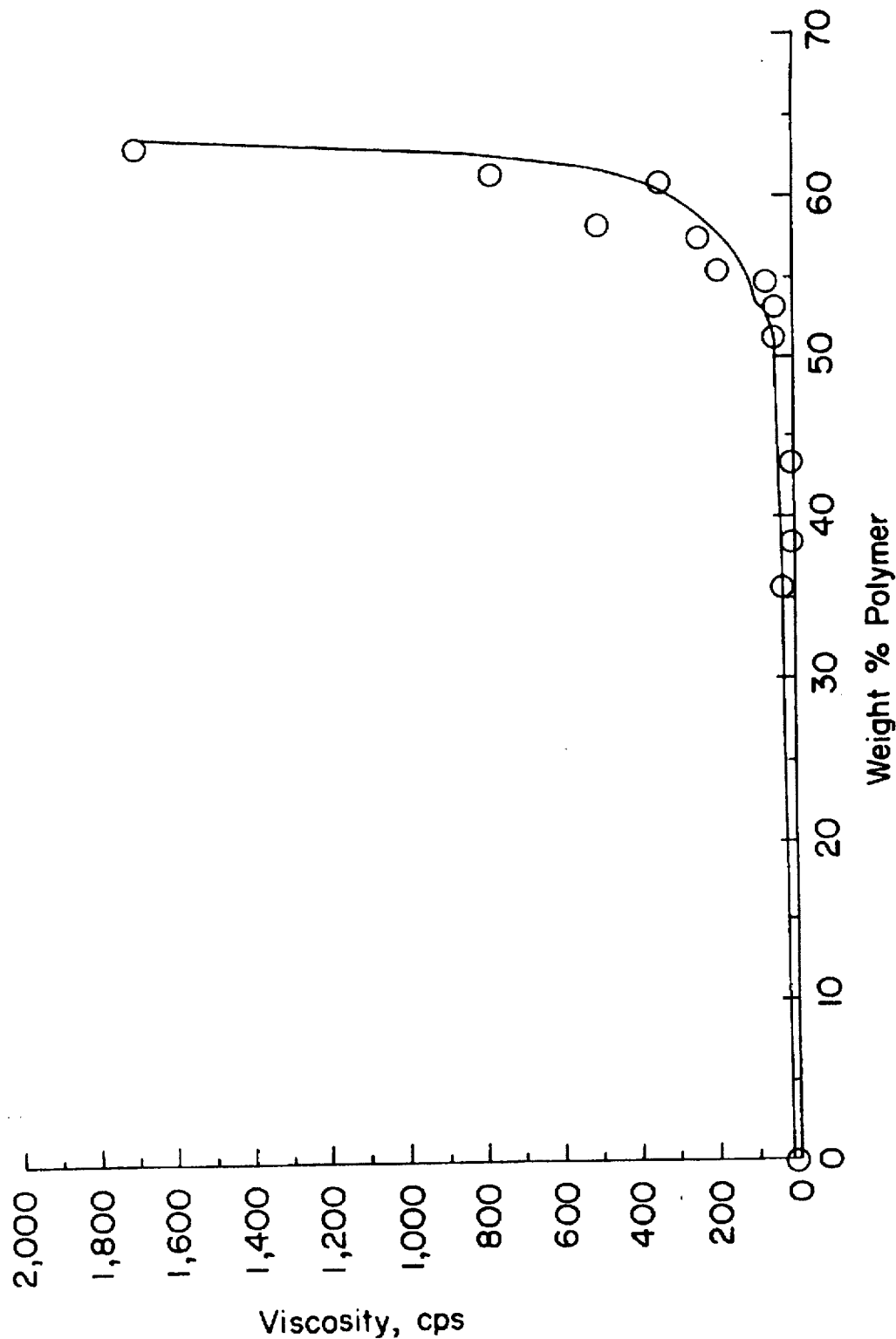
FIG. 4 is a plot of the viscosity in centipoise (cps) of a polymer solution as a function of polymer concentration in water.

The same procedure as described in Example 1 is followed for the preparation of a pre-$Al_2O_3$ polymer solution. The solution concentration is adjusted so that the total polymer to water weight ratio is 1:2. The viscosity of the solution is approximately 50 centipoise, refer to FIG. 4, and the density equals 1.47 g/cc. This polymer solution is used to vacuum impregnate an $Al_2O_3$ preform tube whose dimensions are 1.5" I.D., 1.75" O.D., and 1" in length. The tube is prepared by filament winding Almax, a registered trademark of Mitsui Mining Co., Japan, $Al_2O_3$ fibers. The impregnated tube is dried in air at 110° C. for 24 hours and calcined at 500° C. The process of impregnation and calcination is repeated 15 times with 2 intermittent (after five repeats) 1100° C. sintering cycles. The porosity of the tube after 15 impregnation cycles is 18%. It has been found that further impregnations do not decrease the porosity beyond 18%. It can be decreased further only by an alcohol addition, as described in Example 4.

EXAMPLE 4

$Al_2O_3$ Matrix Composite Fabrication—Alcohol Addition

Figure 5:
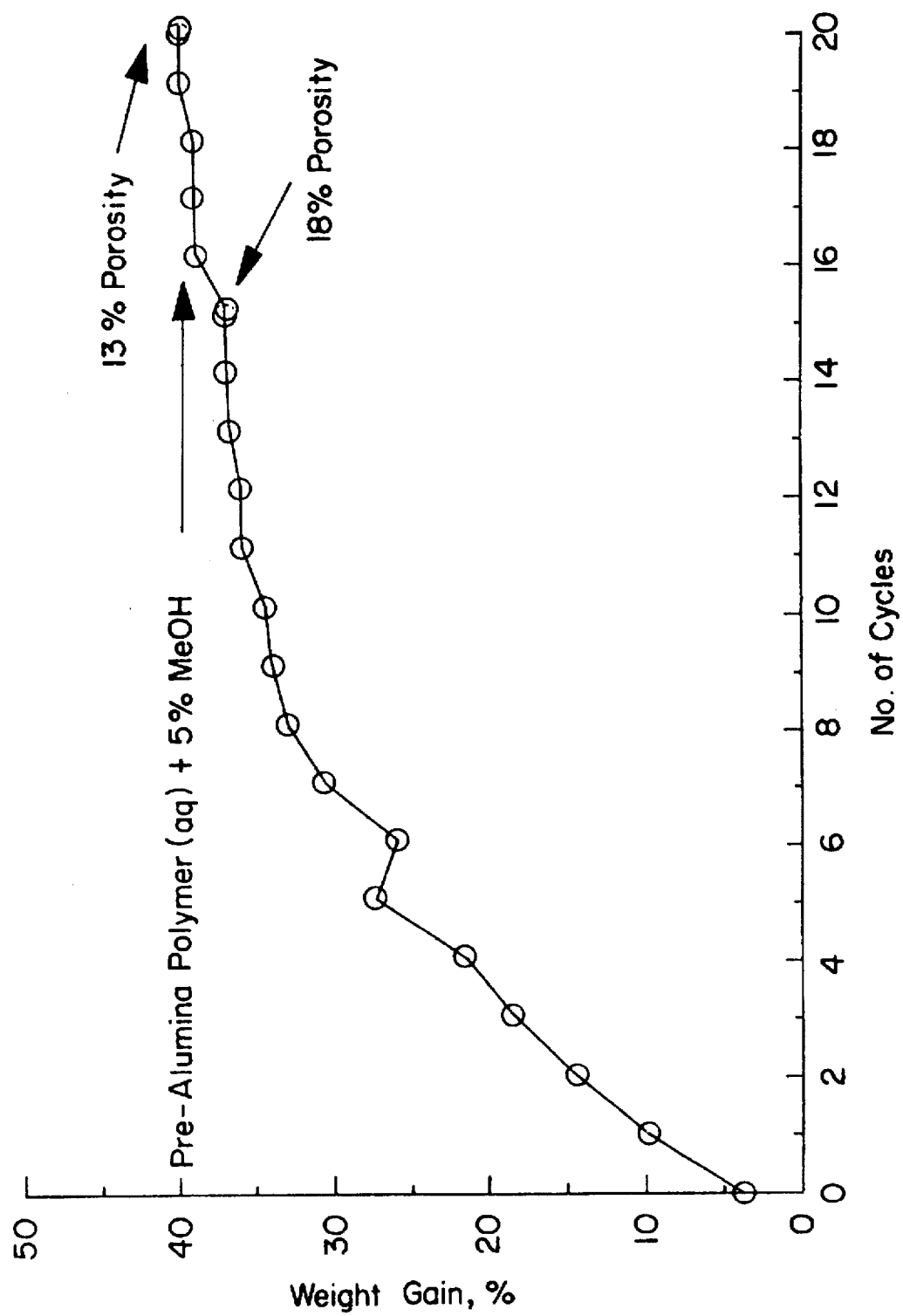
FIG. 5 is a plot of the weight gain of a ceramic matrix composite tube as a function of the number of impregnations with a pre-$Al_2O_3$ polymer solution.
Figure 6:
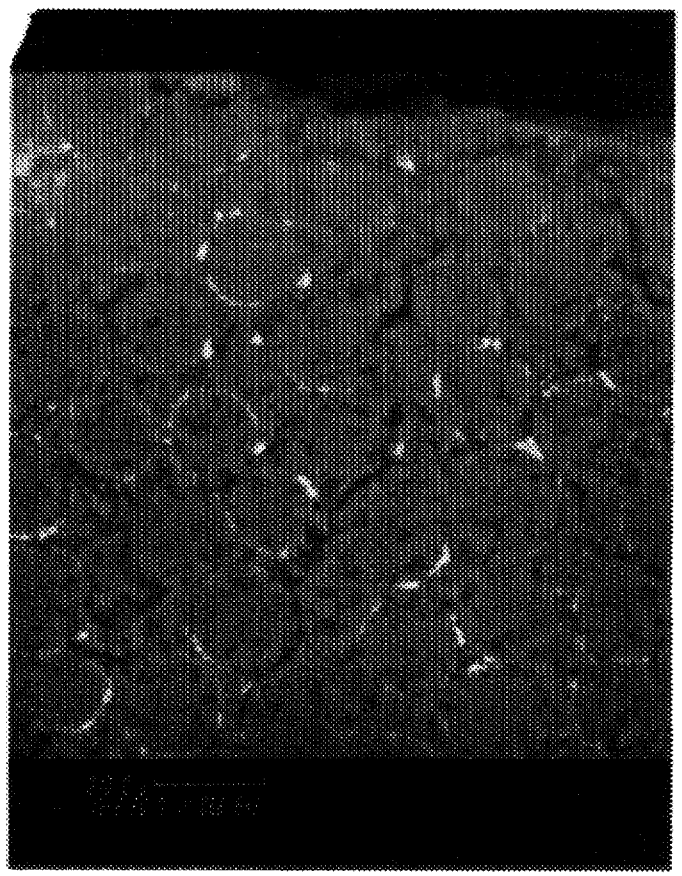
FIG. 6 is a Scanning Electron Microscope microphotograph of a cross-section of an $Al_2O_3$ fiber/$Al_2O_3$ matrix composite.

The same fabrication procedure as in Example 3 is followed to prepare a solution whose concentration based on $Al_2O_3$ content is 25% by weight. 7.9 g of methanol (MeOH) is added to 160 g of this solution and stirred. The viscosity of this solution is 14.8 cps. A solution containing only water possesses a viscosity of 46.6 cps. The concentration of alcohol is only 5%, but the drastically reduced viscosity and surface tension of the solution greatly improves the penetrability of the polymer in preforms. With the modified solution, porosity levels as low as 13% can be achieved, as shown in FIG. 5. This composite tube has a dense microstructure, as seen in FIG. 6.

EXAMPLE 5

$Al_2O_3$—$ZrO_2$ Matrix Composite Fabrication

The same procedure as in Example 1 is followed to prepare a pre-$Al_2O_3$ polymer solution. The concentration is adjusted so that the polymer to water ratio is 1:1.75 by weight. 95 g of nitrate stabilized zirconia sol (Zr 10/20, a registered trademark of Nyacol, Inc., Ashland, Mass.) whose concentration is 20% by weight is added to 262.5 g of this solution. The formed mixture is clear and colorless. For long term stability, the solution pH must be below 2. This mixture is used to fabricate $Al_2O_3$—$ZrO_2$ matrix composite tubes by following the same impregnation and heat treatment cycles described in Example 3.

EXAMPLE 6

$Al_2O_3$—$ZrO_2$ Matrix Composite Fabrication

The same preparatory procedure as in Example 5 is followed, except for the replacement of $ZrO(NO_3)xH_2O$ for the nitrate stabilized sol.

EXAMPLE 7

Al$_2$O$_3$ Fibers

Figure 7:
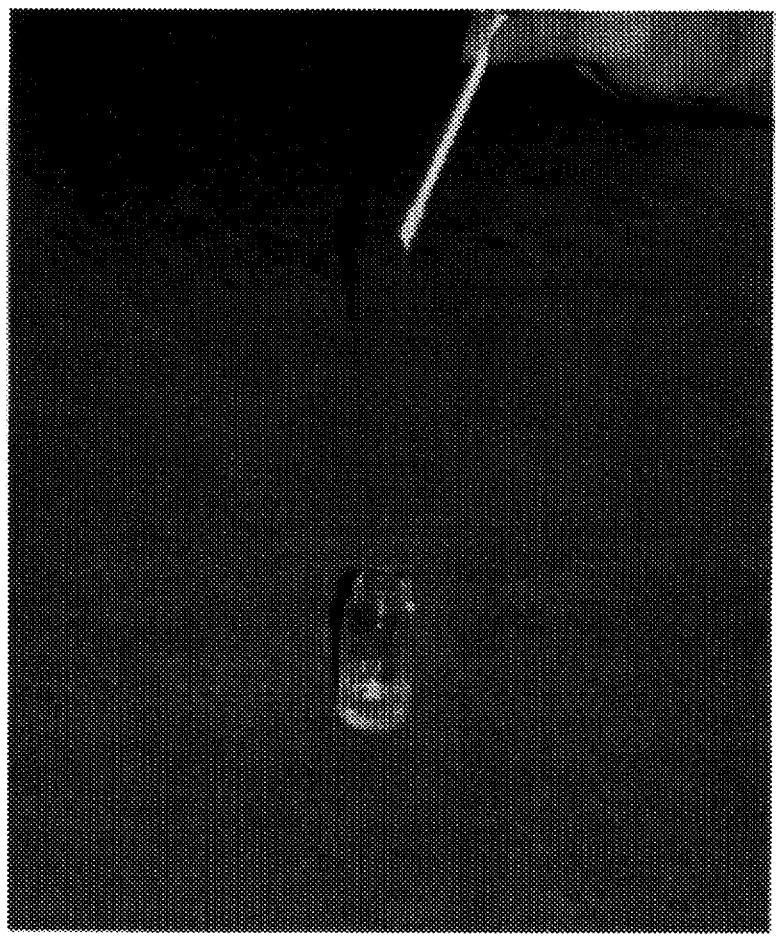
FIG. 7 is a photograph of an $Al_2O_3$ fiber being pulled from a concentrated pre-$Al_2O_3$ polymer solution.
Figure 8A:
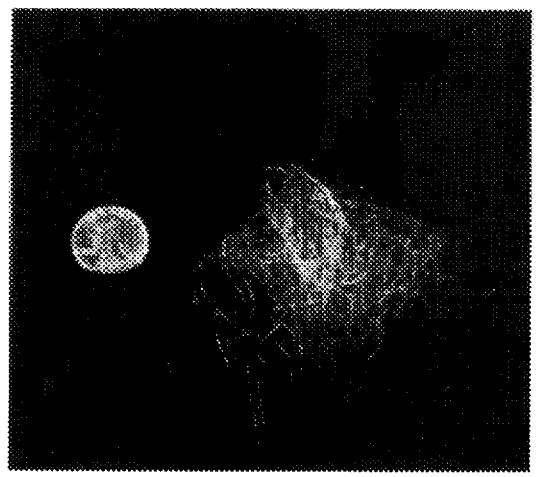
FIG. 8(a) is a photograph of as-drawn $Al_2O_3$ fibers from a polymer solution.
Figure 8B:
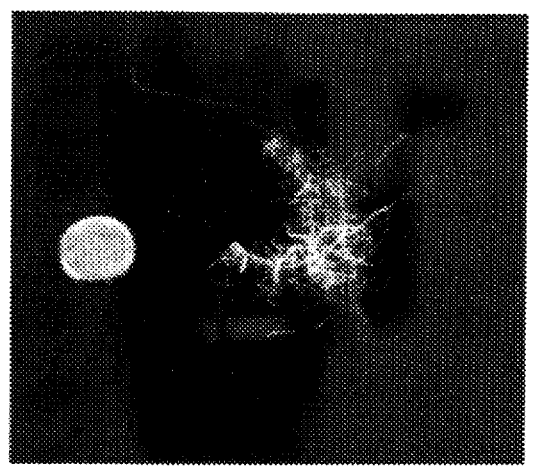
FIG. 8(b) is a photograph of the same fiber after heat treatment at 1200° C.
Figure 9A:
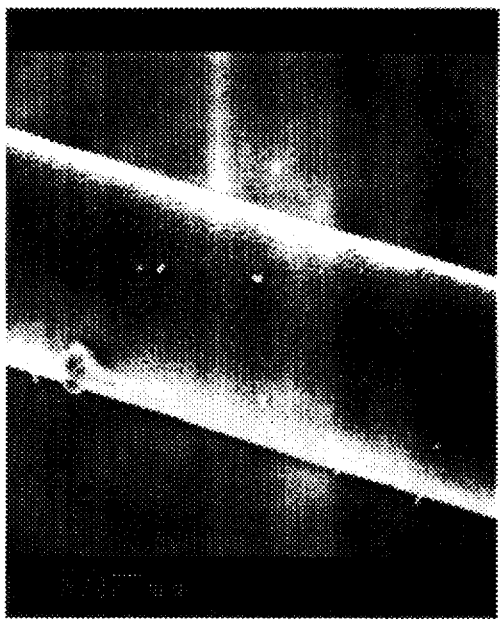
FIG. 9(a) is an SEM micrograph of the same fiber shown in FIG. 8(b)
Figure 9B:
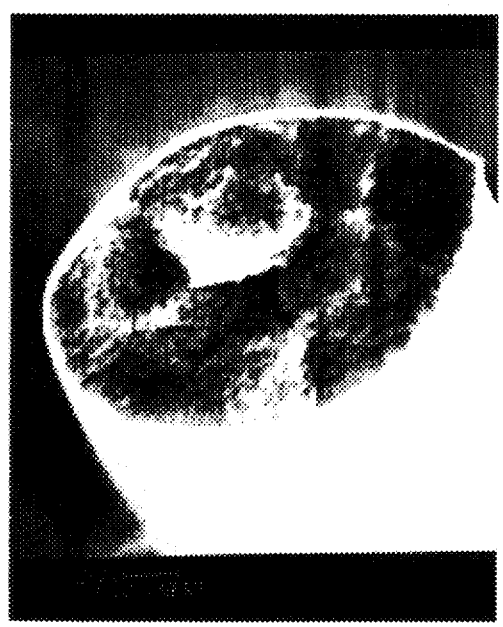
FIG. 9(b) is an SEM micrograph of a fractured surface.

The same materials and procedure as in Example 1 are followed to prepare a pre-Al$_2$O$_3$ polymer solution. The solution is then concentrated with mild heat (60° to 80° C.) until the room temperature viscosity exceeds 106 centipoise. A glass rod or stainless steel spatula is inserted into the polymer mass and quickly pulled up. Depending on the pulling speed and the viscosity of the solution, fibers between 10 and 100 μm in diameter can easily be pulled, see FIG. 7. Fiber lengths in excess of 2 m can be achieved readily. FIG. 8(a) shows as-spun fibers that are fine and flexible. The as-spun fibers are dried and calcined by heating them in an electrical box furnace at 1° C./min to 600° C. From 600° C., the temperature is raised to 800° C. at 5° C./min. Following an isothermal hold at 800° C. for 1 hr., the temperature is raised to 1200° C. at 10° C./min. It is held at 1200° C. for 1 hr and then cooled to room temperature at 5aC/min. FIG. 8(b) shows the heat treated α-Al$_2$O$_3$ fibers. It clearly shows that the heat treatment did not damage fiber integrity. FIG. 9(a) shows an SEM micrograph of a sintered α-Al$_2$O$_3$ fiber. The 10 μm fiber is fully dense and consists of grains that are approximately 0.2 μm in diameter.

EXAMPLE 8

Al$_2$O$_3$—(Y$_2$O$_3$)—ZrO$_2$ Fibers

The same preparatory procedure as in Example 7 is followed, except for the addition of fine Y$_2$O$_3$ stabilized ZrO$_2$ powder. The powder is prepared by dispersing commercially available 8 mole % Y$_2$O$_3$ stabilized ZrO$_2$ (Zircon Products, Inc., New York) in water at a pH of 4. The dispersion is covered with a polyethylene film and allowed to stand for 1 week. Particles finer than 0.2 μm in diameter are collected by classification and added to the alumina polymer solution. The fiber spinning and heat treatment procedures are exactly the same as those described in Example 7.

EXAMPLE 9

Al$_2$O$_3$—Y$_3$Al$_5$O$_{12}$ Fibers

The same preparatory procedure as in Example 8 is followed, except for the replacement of ZrO$_2$ particles with Y$_3$Al$_5$O$_{12}$. Y$_3$Al$_5$O$_{12}$ powder is prepared by dissolving 86.1774 g of Y(NO$_3$)$_3$6H$_2$O and 140.6739 g of Al(NO$_3$)$_3$9H$_2$O in 200 g of distilled water. In a separate beaker, 150 g of aqueous NH$_3$ is mixed with 300 g of distilled water. While vigorously stirring, the first solution is poured into the ammonia solution. White, gelatinous particles precipitate immediately upon mixing. The powder suspension is then washed 4 times with excess distilled water. It is then calcined at 800° C.

EXAMPLE 10

Al$_2$O$_3$ Thin Films

The same materials and preparatory procedure used in Example 1 are followed to produce a highly concentrated polymer solution. The polymer concentration is between 50% and 60%. A polished piece of hot pressed Y$_2$O$_3$ stabilized ZrO$_2$ is then dipped into the solution and slowly pulled upward. The coated piece is then dried at room temperature for 24 hr and heated to 500° C. at 1° C./min. The temperature is then raised to 1200° C. at 5° C./min and held for 1 hr. The process of dipping, drying, and heating is repeated until a sufficiently thick coating is obtained.

The foregoing examples are intended for illustrative purposes and are not meant to limit the present invention. For example, other fiber forming techniques such as gas jet fiberization or a spinnerette may be employed for making fibers in Example 7. Similarly, other coating techniques may be used in Example 10.

The following Table 1 provides several precursors tested including the weight loss and water solubility.

TABLE 1

| PRECURSOR | WEIGHT LOSS* | WATER SOLUBILITY |
|---|---|---|
| AlCl$_3$6H$_2$O | 18.3% | Yes |
|  | 24.4 | Yes |
|  | 48.0 | Yes |
|  | 59.0 | Yes |
|  | 61.4 | Yes |
|  | 61.66 | Yes |
|  | 74.7 | No |
| Al(NO$_3$)$_3$9H$_2$O | 63.5 | Yes |
|  | 64.3 | Yes |
|  | 66.5 | Yes |
|  | 67.3 | Yes |
|  | 68.3 | Yes |
|  | 71.1 | Yes |
|  | 72.6 | Yes |
|  | 72.9 | Yes |
|  | 73.0 | No |
|  | 73.6 | No |
|  | 82.9 | No |
| 3Y(NO$_3$)$_3$6H$_2$O | 14.2 | Yes |
|  | 17.4 | Yes |
|  | 24.5 | Yes |
|  | 27.4 | Yes |
|  | 35.1 | Yes |
|  | 36.1 | No |
| Y(NO$_3$)$_3$6H$_2$O 5Al(NO$_3$)$_3$9H$_2$O | 55.8 | Yes |
|  | 57.6 | Yes |
|  | 58.6 | Yes |
|  | 59.8 | No |
|  | 72.8 | No |

*Weight loss during heat treatment above 110° C.

The process of the present invention is applicable to all hydrated metal salts that melt at low temperatures. For example yttria and yttrium aluminate garnet (YAG) polymers have been successfully processed by the present invention.

The pre-ceramic polymers are easily employed in any of the following commercial applications as well as others.

The low viscosity of the highly concentrated pre-ceramic polymer solutions is ideal for coating or filling micropores. Greater than 10 volume percent alumina solutions with a viscosity less than 100 centipoise have been prepared. This solution is used as a matrix precursor.

The wettability of the pre-ceramic polymer on most commercially important substrates makes it suitable for thin, functional coatings. Deposition of thin, transparent, adherent coatings on glass slides by dip coating has been demonstrated.

The pre-ceramic polymers exhibit high yield which allows little shrinkage related problems. Currently practiced processes for fiber production require either fine powder addition and/or slow heating to control shrinkage.

Binders currently employed in powder processing are fugitive organics, such as poly vinyl alcohol, which are pyrolyzed during heat treatment. Because of its high char yield and suitable rheology, the pre-ceramic polymers of the present invention act as processing aids during forming but as fillers during sintering to decrease the overall shrinkage of bulk ceramics.

Because of their molecular nature, the pre-ceramic polymers can be consolidated and partially sintered to form ultrafine pore filters.

The present invention provides the following advantages over conventionally prepared polymers:

To the best of the inventors' knowledge there are no traditionally prepared pre-oxide polymers that are water soluble.

Yield is one of the most critical features of a polymer since it has a direct consequence on near-net shaping. The pre-ceramic polymers of the present invention have oxide char yields higher than any of the previously known polymers. The alumina precursor polymer, for example, has a char yield near 80%. Prior to the present invention, the highest yield ever reported was 40%.

Because the metal salts employed for this process are readily available at low cost and the only processing equipment required is a ventilated oven, the cost of the polymer is low.

Unlike metal alkoxides, no polymerization is required for rheology control. Rheology is precisely controlled by simply adjusting the only rheology controlling parameter: concentration. Such precise rheology control is impossible with metal alkoxides.

While specific embodiments of the invention have been shown, and described in detail to illustrate the principles of the present invention, certain modifications and improvements will occur to those skilled in the art upon reading the foregoing description. It is thus understood that all such modifications and improvements have been deleted herein for the sake of conciseness and readability but are properly in the scope of the following claims.

We claim:

1. An improved method for making ceramic fibers from a water soluble pre-ceramic polymer, comprising the steps of:

making a water-soluble pre-ceramic polymer, the water soluble pre-ceramic polymer being produced by a polycondensation reaction due to heating hydrated metal salts above their melting points and holding in a well-ventilated oven to drive off water and ligands;

making a water soluble solution by dissolving the water soluble pre-ceramic polymer in heated water;

forming fibers from the water soluble solution;

drying the formed fibers by heating the fibers in an oven at a rate of about 1° C./minute to a first temperature ranging between 600° C. to 750° C.;

raising the first temperature to a second temperature ranging from 800° C. to 1000° C. at about 5° C./minute;

increasing the second temperature to a third temperature of about 1200° C. at about 10° C./minute and holding at the third temperature of about 1200° C. for about one hour; and cooling to room temperature at a rate of about 5° C. to 30° C./minute.

2. An improved method as recited in claim 1, further comprising the step of adding a member selected from the group consisting of a nitrate stabilized zirconia sol, an acetate stabilized zirconia sol, $Y_2O_3$ stabilized $ZrO_2$, and $Y_3Al_5O_{12}$ to the pre-ceramic polymer solution prior to the forming step.

3. An improved method as recited in claim 1, further comprising the step of concentrating the water-soluble pre-ceramic polymer solution with heat to a viscosity exceeding $10^6$ centipoise at room temperature prior to the forming step.

4. An improved method as recited in claim 1, wherein the first temperature is 600° C.

5. An improved method as recited in claim 1, wherein the second temperature is 800° C.

* * * * *

UNITED STATES PATENT AND TRADEMARK OFFICE
CERTIFICATE OF CORRECTION

PATENT NO.    : 5,670,103
DATED         : November 21, 1995
INVENTOR(S)   : Sung, S. Pak and Archie N. Tolley It is certified that error appears in the above-identified patent and that said Letters Patent is hereby corrected as shown below:

<u>Column 1,</u>
Line 9, the following should be added:

-- This Invention was made with Government support under Contract No. DE-FC07-92CE40945 awarded by the Department of Energy. The Government has certain rights in this invention. --

Signed and Sealed this

Thirteenth Day of May, 2003

JAMES E. ROGAN
*Director of the United States Patent and Trademark Office*